Oct. 12, 1965  E. E. ELZUFON ETAL  3,210,931

GAS GENERATOR

Filed Feb. 16, 1962

INVENTORS
Eugene E. Elzufon &
Bill Tate

BY Martha L. Ross
AGENT 3,210,931
GAS GENERATOR
Eugene E. Elzufon, Silver Spring, Md., and Bill Tate, Annandale, Va., assignors to Atlantic Research Corporation, Fairfax County, Va., a corporation of Virginia
Filed Feb. 16, 1962, Ser. No. 174,659
5 Claims. (Cl. 60—35.6)

This invention relates to an intermittently operated gas generator, and in particular to a solid propellant rocket motor capable of intermittent operation.

In certain rocket motor applications, such as in the attitude control or space vectoring of space vehicles, the need has existed for a rocket motor capable of repeated operation to achieve long-term attitude control. In the copending Leeper et al. application entitled Gas Generator filed February 1, 1962, one manner of accomplishing the desired attitude control is disclosed whereby a series of tape encapsulated propellant charges are individually admitted into a separable combustion chamber and ignited to produce a pulsing thrust effect.

The present invention describes another manner of accomplishing attitude control by the use of a rocket motor system which can be located about the various axes of the space vehicle, which is designed to achieve a pulsing thrust effect, which is not burdened by the problems of start-stop operation found in certain conventional systems, and which needs but one ignition device to ignite in serial progression a plurality of propellant charges.

Accordingly, it is an object of the present invention to provide a solid-propellant-fueled gas generator capable of repeated operation.

A further object is to provide a solid-propellant-fueled rocket motor system capable of intermittent firing.

Another object is to provide a rocket motor system supplied with a series of individual propellant grains to effect a pulsating thrust output.

Figure 1:
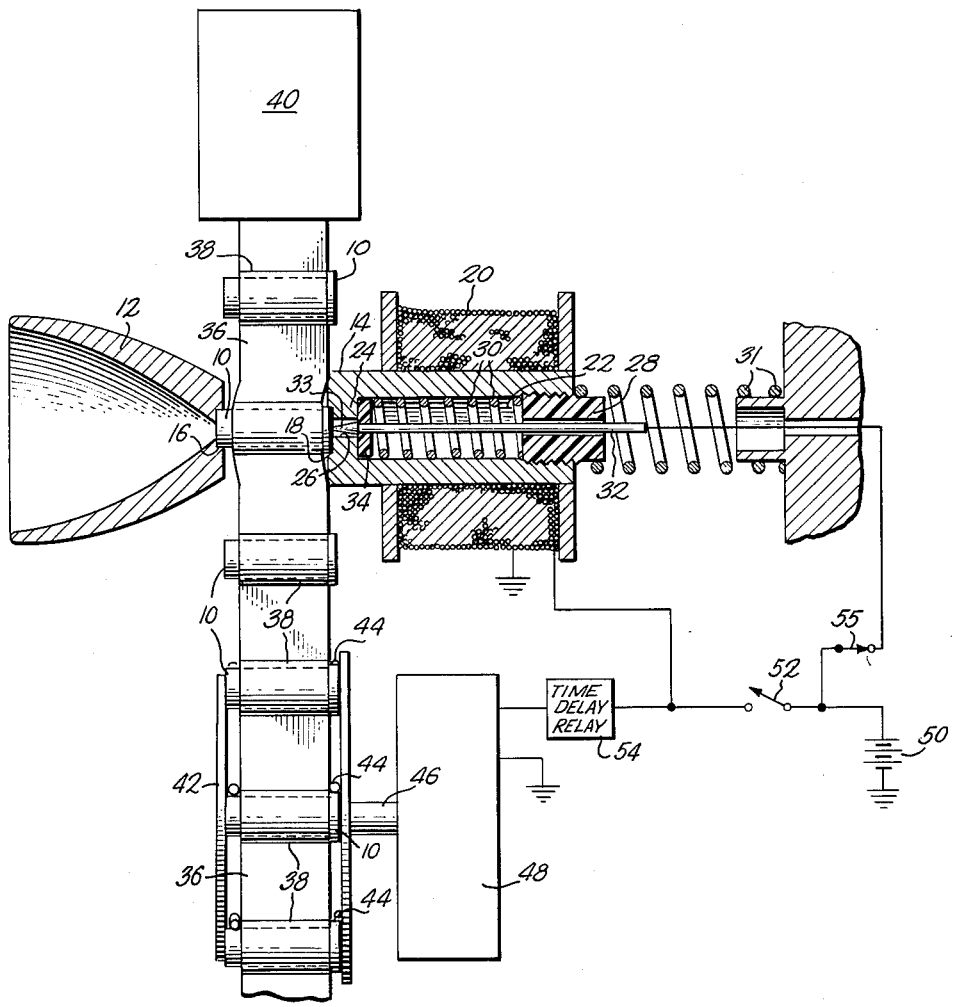
Figure 2:
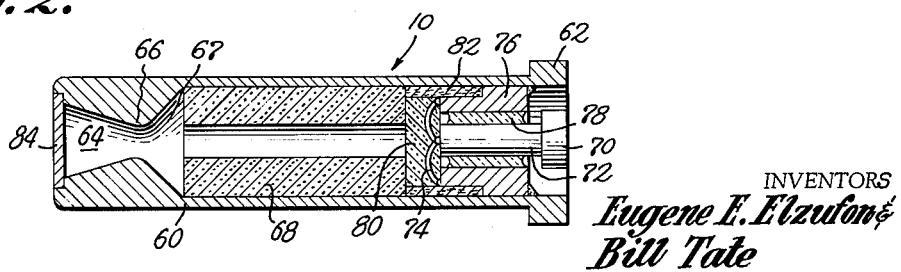

Further objects and advantages will be seen by a reading of the following specification in conjunction with the drawing wherein FIGURE 1 is a longitudinal, partially sectional view of an embodiment of the invention in schematic form. FIGURE 2 is a longitudinal cross section of a cartridge used in FIGURE 1.

Broadly speaking, the invention comprises a pulse rocket which can be used in an attitude control system for a space vehicle. The system is designed to accommodate a series of propellant grains formed as individual cartridges spaced on a continuous strip or belt. The strip is advanced from a storage magazine or chamber along a path that serially positions the cartridges between a flared exhaust nozzle and a retracted breech. When so positioned, the breech is closed and the propellant in the cartridge is ignited, the generated gases being expelled through the exhaust nozzle. The thrust produced by the serially ignited grains is pulsating in its effect and can operate for one or more pulses, depending upon the total thrust demands. Each individual cartridge has a built-in combustion chamber and has a casing constructed with sufficient strength to withstand the combustion temperature and pressure, each cartridge being, in effect, an individual rocket motor.

FIGURE 1 discloses a schematic of an embodiment of the present invention showing a cartridge 10 positioned between an exhaust nozzle or expansion cone 12 and a retractable breech or holding means 14, the cartridge on its aft end being seated in an annular recess 16 in nozzle 12. The interior of the nozzle can be insulated, or can contain a hard, anodized coating to protect it from the hot combustion gases. The forward end of the cartridge 10 is seated in an annular recess 18 in the aft end of the breech 14, the breech serving as the armature or plunger of solenoid 20. The breech 14 has a hollow cylindrical interior 22 terminating at its aft end in a shoulder portion 24, having at its center a circular aperture 26 that communicates with recess 18. At the forward end of the breech is a center-tapped plug 28 made of an insulating material such as Mylar which acts as a seat for coil spring 30, and helps to guide breech return spring 31.

Firing pin 32 is positioned in the interior of the breech 14 and has affixed adjacent to its contact point 33 a disc 34 of insulating material. The disc is biased by spring 30 to force the pin rearward, the movement being limited by shoulder 24 which abuts disc 34. The contact point 33 of the firing pin 32 protrudes through the aperture 26 to contact the forward end of cartridge 10 when the breech 14 is in closed position. By having the firing pin 32 spring-mounted, damage to the point 33 is minimized.

The cartridges 10 are equally spaced on a flexible belt or strip 36 by being firmly contained in loops 38 therein to form a continuous strip or belt of spaced, linked propellant cartridges. As shown, the belt is capable of transverse flexure occurring upon the closing of breech 14. The belt of cartridges can be stored in a magazine 40 in serpentine or overlapping fashion, or, instead, can be wound on a storage drum. The cartridges are fed into the firing position by sprocket 42 having teeth or fingers 44 that engage the cartridges 10 and advance the belt 36 when rotated, one cartridge slipping out of engagement or being released from the teeth after another cartridge is engaged. The sprocket 42 is mounted on shaft 46 which is connected to the armature plate (not shown) of a conventional rotary solenoid 48. The rotary solenoid 48, for each energization, rotates the armature plate through equal angular steps and thereby the sprocket 42 to advance the tape 36 to position, in turn, the equally spaced cartridges 10 in the firing position. Instead as just described, the solenoid 48 can be designed to allow the armature plate to return to its original position when the solenoid is deenergized, necesssitating only a conventional pawl and ratchet arrangement internal of the sprocket 42 to obtain unidirectional, intermittent rotation.

The solenoids 20 and 48 and the firing pin 32 are energized by battery 50, solenoid 20 being actuated by the closing of switch 52. Connected between switch 52 and rotatary solenoid 48 is a conventional time-delay relay 54 which delays the operation of solenoid 48 for a period of time sufficient to permit breech 14 to retract, which time can be, for example, on the order of one second. Switch 52 can be operated manually or automatically and, if automatic in its operation, can be controlled by command signals either within the space vehicle or from a distant point via a radio link to operate switch 52 one or more times to achieve the desired attitude change.

In operation of the aforedescribed apparatus, switch 52 is closed to actuate solenoid 20, retracting breech 14 and compressing spring 31. A cartridge 10, having had its propellant consumed in the last operation cycle, pulls away from its aft seat in recess 16 in nozzle 12 due to the reflex of the belt 36 once the transverse force caused by breech 14 has been removed. After the time delay created by relay 54, solenoid 48 is actuated, rotating sprocket 42 through the desired angle, advancing tape 36 from magazine 40 and positioning the next cartridge 10 in alignment with nozzle 12 and breech 14. Switch 52 is opened and breech 14 closes, engaging cartridges 10 in recess 18 and positioning the aft end in nozzle recess 16.

The point 33 of firing pin 32 contacts a button on the cartridge, as later described, igniting the propellant, the circuit being completed through the grounded exhaust nozzle 12 or, if desired, the breech 14. The propellant in cartridge 10, upon ignition, burns to generate gases, the gases being discharged through nozzle 12 to produce thrust. If desired, once the gases in the combustion chamber of the cartridge 10 have been discharged, switch 52 can again be closed and opened to repeat the operation cycle.

Although firing pin 32 is connected directly to battery 50 through closed switch 55, thus requiring no actuation of this switch for ignition, this switch could be ganged to switch 52 and constructed to close when switch 52 opens and vice versa. A time-delay relay could then be incorporated into the firing circuit as a safety feature to ensure that sufficient time had elapsed after switch 55 closed to enable the cartridge to be firmly seated in nozzle recess 16 by the closing of breech 14.

In FIGURE 2, the construction of an individual cartridge 10 is shown in longitudinal cross section. The cartridge 10 is formed by a hollow cylindrical casing 60 which terminates at its forward end in a flange or rim 62. The casing 60, constructed to withstand the combustion temperature and pressure, can be made of a metal such as aluminum with an exhaust nozzle 64 machined therein. The nozzle and the interior of the casing defining the combustion chamber can be insulated or have a hard anodized coating. The flare or divergence of the nozzle 64 is constructed to form a continuous expansion cone with nozzle 12 when the cartridge is seated in the recess 16. The length of the nozzle 64 in the cartridge can be varied as desired and can be compensated for by changing the length of the nozzle 12 to maintain the full expansion cone. Thus, the nozzle 64 can be eliminated completely, terminating the cartridge at the throat 66, or the nozzle 64 can be constructed as the full expansion cone, dispensing with the need for nozzle 12 which can be replaced by a restraining member to hold or abut the cartridge when positioned by breech 14.

Bonded to the casing 60 within the combustion chamber 67 is, by example, a perforated cylindrical grain 68 of solid propellant of any suitable composition known to the propellant or pyrotechnic arts, such as a double-base propellant comprising nitrocellulose plasticized with nitroglycerine, a composite propellant such as a composition comprising plasticized polyvinyl chloride and ammonium perchlorate, or a metal oxidant mixture such as boron and potassium nitrate held together by a plastic binder. The propellant grain can be of any suitable configuration known in the propellant art, such as end-burning or perforated, to produce the desired, prescheduled mass burning rate.

Ignition of the propellant 68 is through button contact 70 which is contacted by firing pin 32. Button contact 70 is integrally or otherwise connected to shaft portion or extension 72 which is attached to a cylindrical metallic sleeve 76 by glass beads 78 which act as insulation and provide a forward closure for the cartridge. To the aft end of extension 72 is soldered the center of a standard squib resistance wire, generally referred to as a bridgewire 74. The ends of the bridgewire are soldered to the sleeve 76 which is in contact with the interior of the casing 60. The circuit, as formed, is a parallel resistance circuit running from the button 70 through the two legs of the bridgewire 74 and to ground through the casing 60. A common initiation charge such as lead styphnate or a mixture of zirconium and ammonium perchlorate is painted on the bridge wire. A conventional booster charge 80 composed, for example, of a stoichiometric mixture of boron and potassium nitrate with a binder such as cellulose acetate, is positioned between the propellant grain 68 and the bridgewire 74 to assist in igniting the propellant. If it is desired to form the igniting apparatus forward of the propellant grain as a unit, such as performed in standard squib manufacture, a cardboard sleeve 82 fitting in an annular recess in sleeve 76 is used as a cup to assist in positioning the bridgewire 74 and applying the initiation charge and the wet booster charge 80. The booster charge 80 is dried by heat and the entire unit is inserted in the casing 60 until it abuts the grain 68. The sleeve 76 is then soldered to the casing at its forward end. The combustion chamber is sealed at its nozzle by a blow-out closure 84 formed of a material such as lead or a suitable plastic which is soldered or otherwise attached to the casing 60.

The belt or tape 36 can be a double-ply strip of any suitable material of adequate strength and flexibility, preferably an organic polymer such as a polymeric fluorocarbon, e.g. Teflon. The plies can be separated to form the loops 38 for insertion of the cartridges 10. If a single ply strip is used, the loops 38 can be formed separate and bonded or otherwise attached. The cartridges are inserted to their rims 62 in the loops 38 to prevent slippage in the loops under the force of breech 14. The transverse flexure of the belt caused by the breech is slight, but is sufficient to position the cartridges in the nozzle recess 16 without belt deformation such as would prevent the cartridge from springing out of the recess 16 when the breech is retracted. If it is found that the belt 36 has a tendency to advance out of the magazine 40 under the transverse pressure, causing sag and thus cancelling the spring effect, drag can be incorporated in the magazine, or a non-driven rotatable sprocket on which the cartridge belt is fed can be installed between the magazine and firing position, the sprocket having a built-in drag sufficient to permit the necessary transverse belt flexure during ignition, but insufficient to deter the belt advancement during feeding.

While the invention has been described with reference to a particular embodiment, it is apparent that various modifications are obvious to one skilled in the art, and it is not intended to limit the principle of the invention except by the scope of the appended claims.

We claim:
1. A pulse rocket system comprising,
   (a) rocket motor receiving means including a first wall and a second wall spaced from said first wall and an orifice through said first wall,
   (b) a series of individual rocket motors, each of said motors comprising a casing enclosing a combustion chamber and having an exhaust nozzle therethrough, said casing being constructed to withstand the temperature and pressure generated during operation of said motor, a charge of propellant within said combustion chamber and electrical conduction means for effecting passage of ignition current within said motor,
   (c) means for supporting the individual rocket motors, the support means including a continuous belt on which said motors are individually supported in series relationship,
   (d) means for sequentially positioning each of said motors in an ignition position in the space between said first wall and said second wall such that said exhaust nozzle and said orifice are in direct flow communication, and
   (e) ignition means for igniting each of said motors when said each of said motors is in said ignition position.
2. A pulse rocket system comprising,
   (a) rocket motor receiving means including a first section having an orifice therethrough and a second section aligned with and relatively displaceable from said first section,
   (b) a series of individual rocket motors, each of said motors comprising a casing enclosing a combustion chamber and having an exhaust nozzle therethrough, said casing being constructed to withstand the temperature and pressure generated during operation of said motor, a charge of propellant within said combustion chamber and electrical conduction means for effecting passage of ignition current within said motor,
(c) means for supporting the individual rocket motors, the support means including a continuous belt on which said motors are individually supported in series relationship,
(d) storage means for storing said belt and said motors,
(e) means for intermittently advancing said belt and said motors from said storage means and sequentially positioning each of said motors in an ignition position between said first section and said second section such that said exhaust nozzle and said orifice are in direct flow communication,
(f) means for bringing said first and second sections toward one another when one of said motors is in said ignition position to secure said one of said motors in said ignition position, and
(g) ignition means for igniting each of said motors when said each of said motors is in said ignition position.

3. A pulse rocket system as defined in claim 2 wherein said orifice comprises a diverging nozzle and wherein the rocket motor exhaust nozzle comprises a converging nozzle.

4. A pulse rocket system as defined in claim 2 wherein said rocket motor exhaust nozzle comprises a converging-diverging nozzle.

5. A pulse rocket system comprising,
(a) rocket motor receiving means including a nozzle section having a diverging exhaust port and a retractable breech section aligned with and displaceable from said nozzle section,
(b) a series of individual rocket motors, each of said motors comprising a casing enclosing a combustion chamber and having an exhaust nozzle therethrough, at least a portion of the rocket motor exhaust nozzle being convergent, said casing being constructed to withstand the temperature and pressure generated during operation of said motor, a solid propellant grain within said combustion chamber, an igniter for igniting said grain, and electrical conduction means for effecting passage of ignition current to said igniter,
(c) means for supporting the individual rocket motors, the support means including a continuous flexible belt on which said motors are individually supported in series, spaced relationship, the longitudinal axis of each of said motors being oriented normal to the length of said belt and parallel to the face of said belt,
(d) storage means for storing said belt and said motors,
(e) means for intermittently advancing said belt and said motors from said storage means and sequentially positioning each of said motors in an ignition position between said nozzle section and said breech section such that said rocket motor exhaust nozzle and said diverging exhaust port are coaxial,
(f) means for retracting said breech section away from said nozzle section to permit positioning each of said motors in said ignition position, and for moving said breech section toward said nozzle section when one of said motors is in said ignition position to secure said one of said motors in said ignition position, and
(g) electrical ignition means for energizing said igniter when said motor is in said ignition positon.

References Cited by the Examiner
UNITED STATES PATENTS

| | | | |
|---|---|---|---|
| 386,535 | 7/88 | Graham | 42—39.5 |
| 437,365 | 9/80 | Perrna | 42—15 |
| 638,677 | 12/99 | Alfson | 42—39.5 |
| 1,191,299 | 7/16 | Goddard | 102—34.5 |
| 1,824,457 | 9/31 | Barlow. | |
| 2,172,163 | 9/39 | Glowka | 60—35.6 |
| 2,403,730 | 7/46 | MacNeille | 60—26.11 X |
| 2,842,937 | 7/58 | Clark. | |
| 2,957,309 | 10/60 | Kobbeman | 60—35.6 |
| 3,044,254 | 7/62 | Adelman | 60—35.6 |

FOREIGN PATENTS

| | | |
|---|---|---|
| 969,930 | 5/50 | France. |

MARK NEWMAN, *Primary Examiner.*

SAMUEL FEINBERG, SAMUEL LEVINE, *Examiners.*